United States Patent
Moto-Oka et al.

[11] Patent Number: 5,862,424
[45] Date of Patent: Jan. 19, 1999

[54] PHOTOGRAPHY PROCESSING EQUIPMENT, AND DEVICE WHICH KEEPS A FILM IN PLACE IN THE PHOTOGRAPHY PROCESSING EQUIPMENT AND A METHOD FOR READING/WRITING INFORMATION MAGNETICALLY RECORDED IN FILM

[75] Inventors: Eiji Moto-Oka; Hiroshi Oku, both of Wakayama, Japan

[73] Assignee: Noritsu Koki Co., Ltd., Wakayama, Japan

[21] Appl. No.: 709,667

[22] Filed: Sep. 9, 1996

Related U.S. Application Data

[63] Continuation of Ser. No. 412,161, Mar. 28, 1995, abandoned.

[30]     Foreign Application Priority Data

Mar. 28, 1994  [JP]  Japan ..................................... 6-057706
Apr. 5, 1994   [JP]  Japan ..................................... 6-067350

[51] Int. Cl.⁶ .................................................. G03B 17/24
[52] U.S. Cl. ............................................................ 396/320
[58] Field of Search .................................. 354/105, 106; 355/41, 42; 396/319, 320

[56] References Cited

U.S. PATENT DOCUMENTS

| | | | |
|---|---|---|---|
| 5,034,836 | 7/1991 | De Marti, Jr. et al. | 360/104 |
| 5,130,728 | 7/1992 | Goto et al. | 354/105 |
| 5,307,100 | 4/1994 | Kubo | 354/105 |
| 5,400,200 | 3/1995 | Bloemendaal et al. | 360/104 |
| 5,434,633 | 7/1995 | Nagao et al. | 354/106 |
| 5,469,313 | 11/1995 | Isozaki et al. | 360/104 |
| 5,477,290 | 12/1995 | Takeshita | 354/106 |
| 5,481,322 | 1/1996 | Wakabayashi | 354/105 |
| 5,510,864 | 4/1996 | Hills et al. | 354/106 |
| 5,572,268 | 11/1996 | Tamamura | 396/319 |

*Primary Examiner*—Safet Metjahic
*Assistant Examiner*—Christopher E. Mahoney
*Attorney, Agent, or Firm*—Wenderoth, Lind & Ponack, L.L.P.

[57]                ABSTRACT

A photographic processing apparatus having magnetic heads for reading magnetic record data stored in the magnetic recording tracks of a film and writing desired record data onto the same. The apparatus includes a hold-down mechanism for pressing the magnetic head against the film at an appropriate strength.

7 Claims, 5 Drawing Sheets

PHOTOGRAPHY PROCESSING EQUIPMENT, AND DEVICE WHICH KEEPS A FILM IN PLACE IN THE PHOTOGRAPHY PROCESSING EQUIPMENT AND A METHOD FOR READING/WRITING INFORMATION MAGNETICALLY RECORDED IN FILM

This application is a Continuation of now abandoned application, Ser. No. 08/412,161, filed Mar. 28, 1995.

BACKGROUND OF THE INVENTION

The present invention relates to a photographic processing apparatus, a film hold-down mechanism in a photographic processing apparatus, and a method of reading and writing magnetic record data on a photographic film.

In a common photographic processing apparatus, a photographic film is accessed for reading a magnetic record data stored thereon or writing such a data thereto while the film is being securely pressed against a magnetic head by a hold-down means. To facilitate the reading and writing at a high accuracy, it is necessary to have the film held as closely as possible to the magnetic head.

In the prior art it is known that a film A, while passing beside a magnetic head b, is pressed against the magnetic head b by a hold-down member c which is made of a felt material and located opposite to the magnetic head b, as shown in FIG. 8.

Unfortunately, the felt hold-down member c tends to block and store considerable amounts of dirt and dust which are carried on the film A.

Accordingly, the film itself may be injured by the dirt and dust on the hold-down member. Also, if the hold-down member c is pressed against the magnetic head b by a high pressing force for optimum tightness, it may be difficult to advance the film between the magnetic head b and the hold-down member c or the film may become trapped therebetween.

It is an object of the present invention, in view of the foregoing direction, to provide improvements in a photographic processing apparatus, a film hold-down mechanism in a photographic processing apparatus, and a method of reading and writing magnetic record data on a photographic film. This improvements are characterized in that a magnetic head is free from blocking and storing of amounts of dirt and dust, that a photographic film to be transferred is prevented from being injured, that a record data can be accurately be read from and written onto the film, that the film can easily be inserted between the magnetic head and a hold-down because the pressing of the hold-down mechanism the magnetic head is controllable, and that a magnetic record data can be read from and written onto the film with ease.

SUMMARY OF THE INVENTION

In order to achieve of the above object of the present invention, several improvements have been developed. A photographic processing apparatus, which has magnetic heads for reading magnetic record data stored in the magnetic recording tracks of a film and writing desired record data onto the same, is characterized by a pressing means for pressing the magnetic heads against the film at an appropriate strength, and a film detecting means.

Also, a film hold-down mechanism for use in a photographic processing apparatus, which includes magnetic heads for reading magnetic record data stored on a film and writing desired record data onto the same, is characterized by rotating members mounted by resilient means to a movable member which is located on the opposite side of the film to the magnetic heads.

Another film hold-down mechanism for use in a photographic processing apparatus having magnetic heads for reading magnetic record data stored on a film and writing desired record data onto the same, is characterized by two pairs of rollers rotatably mounted by two brackets respectively which are linked at bottom by springs respectively to a movable member, each pair of the rollers being located on the opposite side of the film to a corresponding magnetic head.

A method of reading magnetic record data stored in the magnetic recording tracks of a film and writing desired record data onto the same is characterized in that upon the transfer of the film being detected to a target magnetic head by the action of drive rollers the magnetic head is pressed against the film so as to read the magnetic record data stored on the film or write the desired record data onto the same during the traveling of the film.

The magnetic heads are pressed against the film having magnetic recording tracks at an appropriate strength by the action of the pressing means, thus allowing the film to be under constant tension.

When the movable member of the mechanism is moved towards the magnetic heads, the rotating members mounted by the resilient means to the movable member come into direct contact with the film and then presses the film against the magnetic heads.

This allows the film to run directly on the magnetic heads which reliably reads the magnetic record data from the film or writes such data onto the film.

Due to their rotating movement in the direction of transfer of the film, the rotating members are prevented from blocking and accumulating dirt or dust. Thus, the magnetic heads will be maintained free from dirt and dust.

Also, as the rotating members are supported by the resilient members, they can press the film against the magnetic heads at a moderate strength when being urged by the movement of the movable member towards the heads.

When pairs of rollers are used, each pair of the rollers press the film against the corresponding magnetic head so that the film comes into direct contact with an arcuate front portion of the magnetic head.

This will allow the magnetic head to accurately and easily read or write the magnetic record data on the film.

Additionally, the rollers in the brackets when being pressed against the film by the movable member reserve a considerable size of space between the film and the brackets, thus preventing the deposition of dirt and dust about and on the magnetic heads.

According to the method, upon the transfer of the film to the target magnetic head by the action of the drive rollers being detected, the magnetic head is pressed against the film. More specifically, the magnetic head is pressed against the film at an appropriate strength for reading the magnetic record data stored in the magnetic recording tracks on the film or writing the desired record data onto the same during the travel of the film towards a set of the rollers positioned at a downstream portion of the film transfer path.

DETAILED DESCRIPTION OF THE PREFERRED EMBODIMENTS

Figure 1:
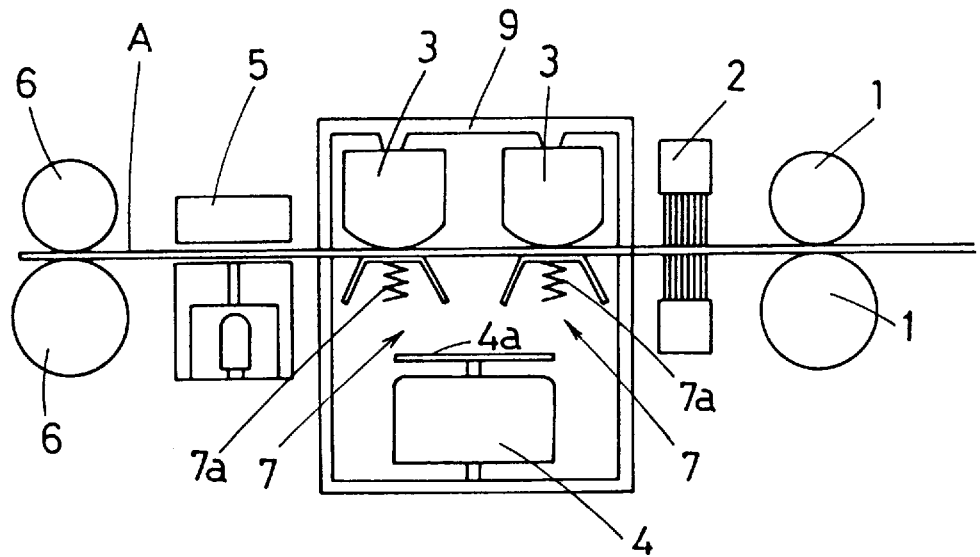
FIG. 1 is a schematic front view showing the essential features of a first embodiment of the present invention.

Preferred embodiments of the present invention will be described referring to FIGS. 1 to 7.

Illustrated in FIGS. 1 to 4 is a film hold-down mechanism in a photographic processing apparatus according to one embodiment of the present invention. There are provided first transfer rollers 1, a negative brush 2, magnetic heads 3, a solenoid 4, a perforation detecting sensor 5, and second transfer rollers 6, which are aligned in a row from the first transfer rollers 1 to the second transfer rollers 6.

A photographic film, having a series of magnetic recording tracks provided thereon as denoted by A (referred to, a film hereinafter) is transferred along a transfer path from the first transfer rollers 1 to the negative brush 2, the magnetic heads 3, the solenoid 4, the perforation detecting sensor 5, and the second transfer rollers 6 as driven by the first and second transfer rollers 1, 6. While the film A is being carried between the first transfer rollers 1 and second the transfer rollers 6, it is pressed down by a downward displacement of the magnetic heads 3 across the transfer path which extends tangent to the first and second transfer rollers 1, 6.

A pressing member 7 is located on the opposite side of the path of the film A relative to each of the two magnetic heads 3. The pressing member 7 includes two contact plates 8 each of which are biased by a spring 7a towards the corresponding magnetic head 3. The magnetic head 3 has a back or upper surface 3a linked to a substantially square shape actuator frame 9.

The actuator frame 9 is in turn connected to a movable plunger 4a of the solenoid 4 disposed on the spring 7a side as shown in FIG. 1. When the solenoid 4 is energized, the movable plunger 4a is attracted to move from an original location shown in FIG. 1 to the location shown in FIG. 2.

Figure 2:
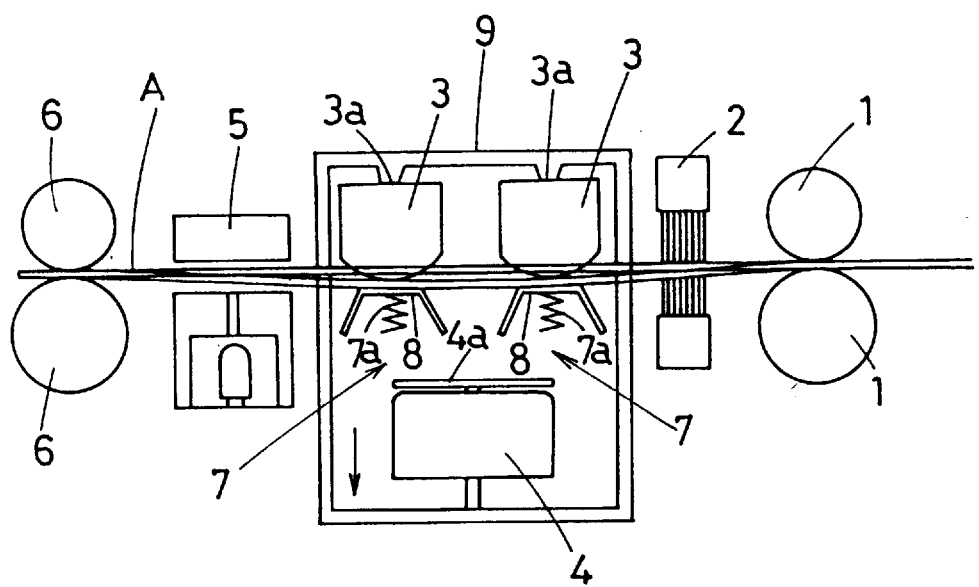
FIG. 2 is a schematic front view showing the action of magnetic heads in the essential features of the embodiment.
Figure 3:
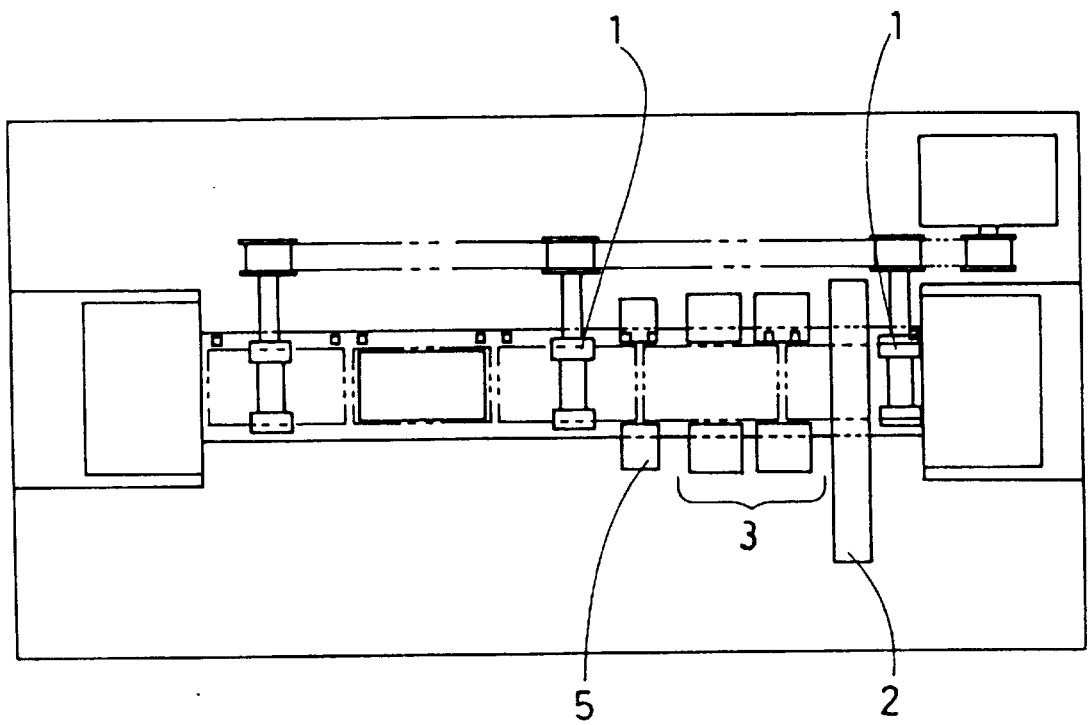
FIG. 3 is a schematic plan view of the first embodiment.
Figure 4:
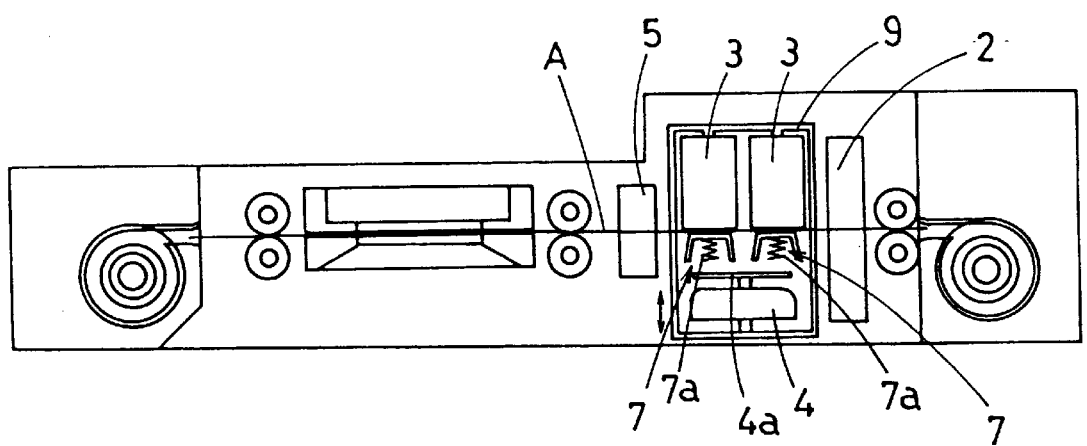
FIG. 4 is a schematic front view showing the essential features part of the embodiment.

Accordingly, the actuator frame 9 is moved in a downward direction denoted by the arrow in FIG. 2 and applies a moderate pressing force to the backs 3a of the respective magnetic heads 3. The magnetic heads 3 press against the yielding force of the springs 7a of the pressing members 7, thus allowing the displacement of the magnetic heads 3 towards the film A.

Simultaneously, the film A which is sandwiched between the magnetic heads 3 and the contact plate 8 is adequately secured due to the counter action of the springs 7a.

As the film A travels from the first transfer rollers 1 to the negative brush 2, the magnetic heads 3, the solenoid 4, the perforation detecting sensor 5, and the second transfer rollers 6, the film's perforations are detected, counted, and translated to a pulse signal indicating a predetermined record track. The signal actuates the solenoid 4 (or a motor) for displacement of the magnetic heads 3 to a target track on the film A.

The displacement of the magnetic heads 3 produces a tension on the film A thus allowing the magnetic heads 3 to accurately read and write any magnetic record data on the film A.

Figure 5:
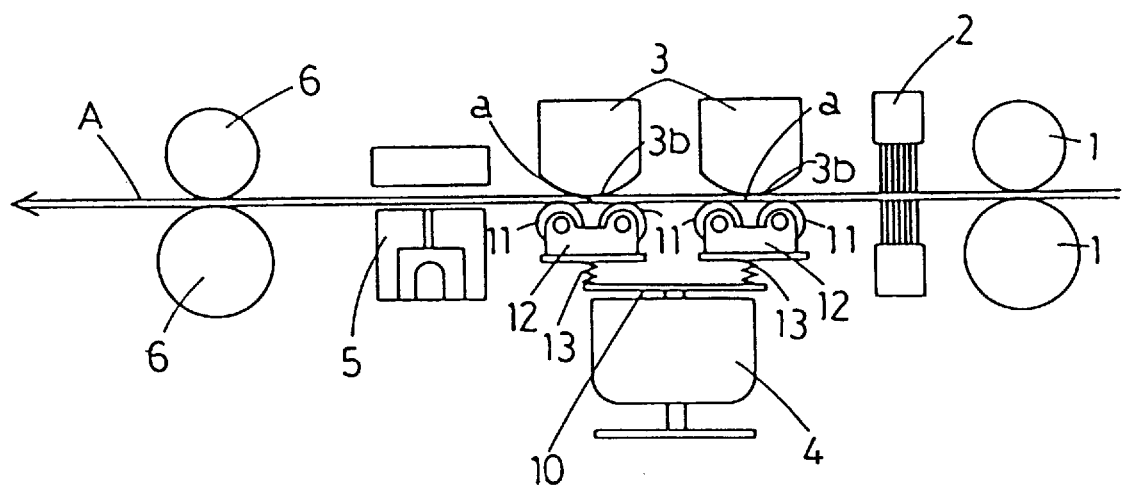
FIG. 5 is a schematic front view of second embodiment of the present invention.
Figure 6:
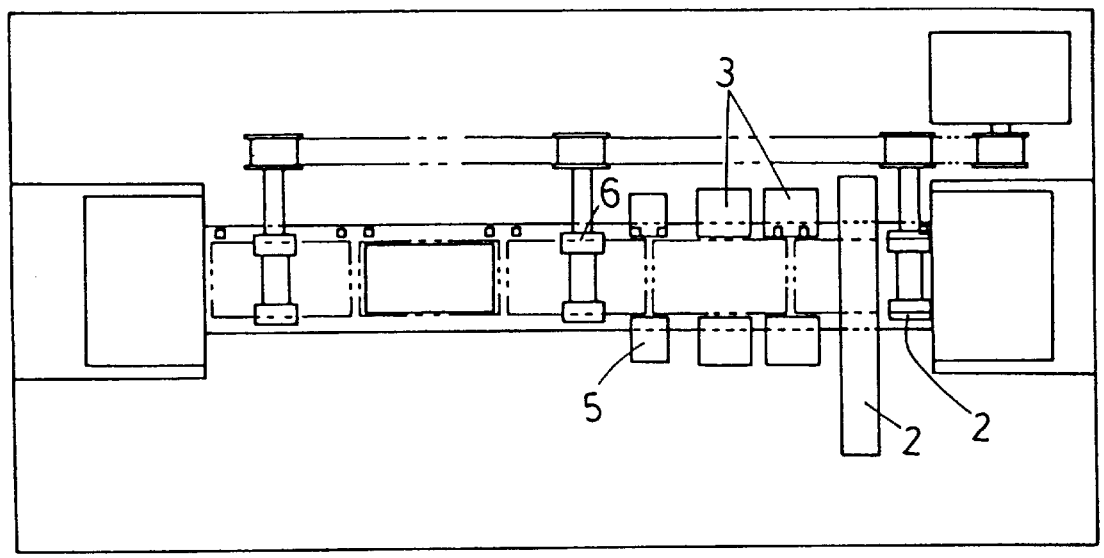
FIG. 6 is a schematic plan view part of the another embodiment.
Figure 7:
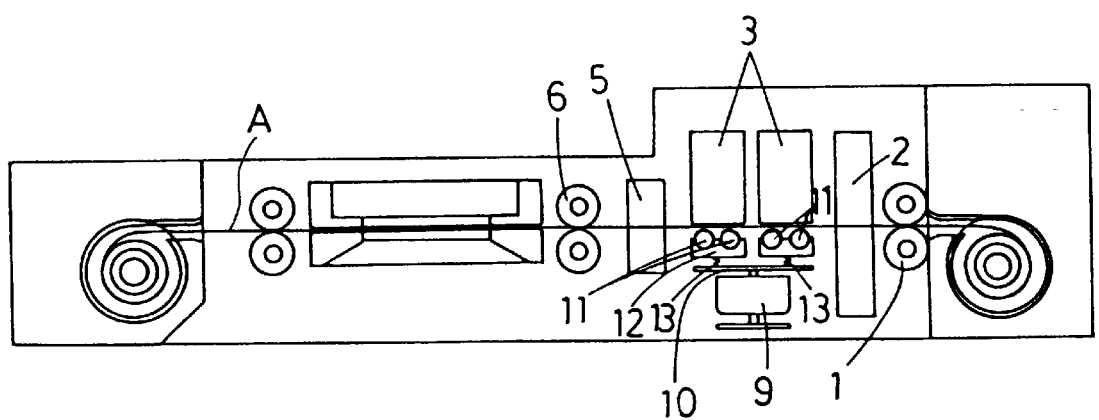
FIG. 7 is a schematic front view showing a primary part of a third embodiment of the present invention.
Figure 8:
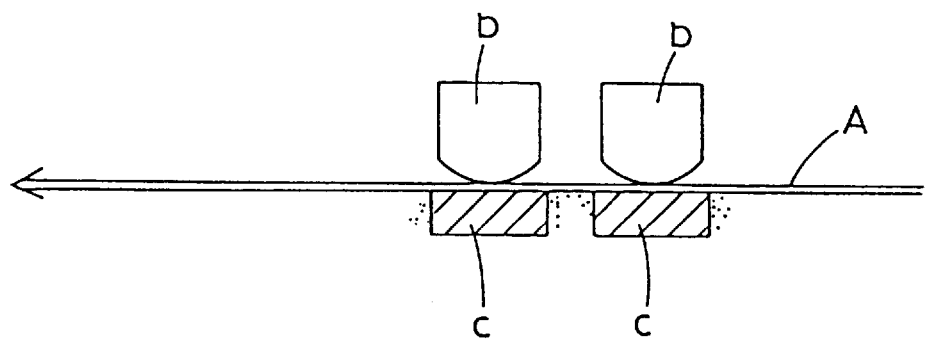
FIG. 8 is a schematic view of a prior art film hold-down mechanism.

FIGS. 5 to 7 illustrate a film hold-down mechanism in a photographic processing apparatus showing another embodiment of the present invention. As best shown in FIG. 5, a film A is passed from first transfer rollers 1 to a brush 2, magnetic heads 3, sets of rollers 11, a perforation detecting sensor 5, and second transfer rollers 6, similar to the previous embodiment.

The two magnetic heads 3 are disposed between the brush 2 and the perforation detecting sensor 5 which are spaced by a given distance from each other. Each of the magnetic heads 3 has an arcuate head surface 3b.

Two rollers 11, 11 are disposed opposite to the arcuate head surface 3b of the magnetic head 3. The roller are rotatably supported by a bracket 12 and are spaced from each other by a small distance.

The bracket 12 supporting the two rollers 11, 11 has a spring 13 mounted on the bottom thereof. The spring 13 is connected to a movable plunger 10 of a solenoid 4. As the movable plunger 10 is driven, the rollers 11 to moved to and from the magnetic heads 3.

When the film A is introduced, the rollers 11 are separated from the magnetic heads 3 to ease the feeding of the film A to a transfer path.

Accordingly, upon energization of the solenoid 4, the movable plunger 10 moves towards the magnetic heads 3 and lifts up the rollers 11 which in turn press the film A against the arcuate head surfaces 3b of their respective magnetic heads 3.

By then, a target track on the film A has been identified by counting the number of pulses from the perforation detecting sensor 5. As the target track on the film A between the two rollers 11 is pressed against the arcuate head surface 3b of the corresponding magnetic head 3, the film deflects a bit and comes into close contact with the arcuate head surface 3b, thereby allowing the magnetic head 3 to read the magnetic record data without error or to write any magnetic record data thereto accurately.

The rollers 11 in the bracket 12 rotate in the direction of transfer as the film A is transferred. Also, there is a sufficient space about the rollers 11 and between the film A and the brackets 12 to prevent the capture and accumulation of dirt and dust. Furthermore, the rollers 11 come into virtually no frictional contact with the advancing film A, thus reducing the possibility of injuring the film A.

What is claimed is:

1. A film hold-down mechanism comprising:

a frame;

at least one magnetic head mounted on said frame on a first side of a film transfer path;

at least one contact plate positioned on a second side of the transfer path opposite said first side, said at least one contact plate having a film contacting surface and being disposed directly opposite said at least one magnetic head; and a solenoid disposed on said second side of said film transfer path and connected to said frame for moving said frame to cause said at least one magnetic head to move toward said at least one contact plate and press the film between said at least one magnetic head and said at least one contact plate, wherein said magnetic head moves along a path which is perpendicular to said film contacting surface of said at least one contact plate.

2. The film hold-down mechanism as claimed in claim 1, wherein said frame is rectangular in shape.

3. The film hold-down mechanism as claimed in claim 1, wherein:

said at least one magnetic head comprises a first and a second magnetic head; and said at least one contact plate comprises a first and a second contact plate, said first and second magnetic heads being spaced along the film transfer path and said first and second contact plates being spaced apart along the transfer path.

4. The film hold-down mechanism as claimed in claim 3, further comprising:

a first spring biasing said first contact plate toward said first magnetic head; and a second spring biasing said second contact plate toward said second magnetic head.

5. The film hold-down mechanism as claimed in claim 1, wherein said detecting means is adapted to count the film perforations and translate the detected and counted perforations into a pulse signal.

6. The film hold-down mechanism as claimed in claim 1, further comprising detecting means, positioned adjacent the film transfer path, for detecting a predetermined location on a film.

7. Method of reading magnetic record data stored in a magnetic record track of a film and writing record data onto a magnetic record track of the film, the method comprising:

a) providing a hold-down mechanism including:
  a frame supporting at least one magnetic head on a first side of a film transfer path;
  at least one contact plate positioned on a second side of the transfer path opposite said first side, said at least one contact plate being disposed opposite said at least one magnetic head; and
  a solenoid connected to said frame on said second side of said transfer path for moving said frame to cause said at least one magnetic head to move along a path which is perpendicular to a contact surface of said at least one contact plate;

b) advancing a film along said film transfer path by drive rollers;

c) detecting film perforations and translating the detected and counted perforations into a pulse signal;

d) actuating said film hold-down mechanism in response to the pulse signal to directly press the film against said at least one magnetic head; and e) writing magnetic record data on the film or reading data previously written on the film.

\* \* \* \* \*